United States Patent [19]

Sugasawa et al.

[11] Patent Number: 4,970,646
[45] Date of Patent: Nov. 13, 1990

[54] VEHICLE HAVING SECONDARILY STEERED FRONT AND REAR WHEELS

[75] Inventors: Fukashi Sugasawa, Yokohama; Kazunori Mori, Ebina; Kenji Kawagoe, Iochigi; Hiroshi Mouri, Yokosuka; Junsuke Kuroki, Yokohama, all of Japan

[73] Assignee: Nissan Motor Co., Ltd., Yokohama, Japan

[21] Appl. No.: 269,698

[22] Filed: Nov. 10, 1988

[30] Foreign Application Priority Data

Nov. 12, 1987 [JP] Japan .................................. 62-284103
Nov. 12, 1987 [JP] Japan .................................. 62-284104

[51] Int. Cl.⁵ ................................................ B62D 5/00
[52] U.S. Cl. ................................ 364/424.05; 180/140; 280/91
[58] Field of Search ...................... 364/424.05; 180/140–143, 79.1; 280/91; 74/388 P

[56] References Cited

U.S. PATENT DOCUMENTS

| | | | |
|---|---|---|---|
| 4,666,013 | 5/1987 | Shibahata et al. | 180/141 |
| 4,706,771 | 11/1987 | Kawabe et al. | 180/142 |
| 4,720,790 | 1/1988 | Miki et al. | 364/424.05 |
| 4,768,602 | 9/1988 | Inoue et al. | 180/140 |
| 4,781,262 | 1/1988 | Nakamura et al. | 180/140 |
| 4,828,061 | 5/1989 | Kimbrough et al. | 180/79.1 |
| 4,828,064 | 5/1989 | Furutani et al. | 180/140 |
| 4,834,205 | 5/1989 | Mizuno et al. | 180/141 |

*Primary Examiner*—Thomas G. Black
*Attorney, Agent, or Firm*—Foley & Lardner, Schwartz, Jeffery, Schwaab, Mack, Blumenthal & Evans

[57] ABSTRACT

A method of steering a vehicle having a set of steerable front wheels and a set of steerable rear wheels. The front and rear wheels are both secondarily steered in addition to a main steer of the front wheels caused by an operation of a front wheel steering gear in response to an operation of a steering wheel. The method comprises providing to the front wheels a secondary steer angle corresponding to at least a differentiated value of a steer angle of a steering wheel in such a way as to increase an overall steer angle of the front wheels and providing to the rear wheels a secondary steer angle proportional to the steer angle of the steering wheel and in the same direction as the steer angle of the front wheels.

8 Claims, 8 Drawing Sheets

VEHICLE HAVING SECONDARILY STEERED FRONT AND REAR WHEELS

BACKGROUND OF THE INVENTION

1. Field of the Invention

The present invention relates to a method of steering a vehicle, of such a kind that the front and rear wheels are both secondarily steerable in addition to a main steer of the front wheels.

2. Description of the Prior Art

In cases where both the front and rear wheels are secondarily steerable, it is known to maintain the yaw rate and lateral acceleration unchanged irrespectively of the speed of rotation of the steering wheel by making flat the frequency characteristics of the yaw rate and lateral acceleration relative to the steering frequency through control of the respective secondary steer angles. By this, the passenger or passengers can always feel the same yaw rate and lateral acceleration and therefore can be free from an otherwise caused uneasiness at the beginning of cornering.

To this end, as described in "Gakujutsu Kōen-kai Maezuri-syū No. 871017" published by Society of Automotive Engineering of Japan in May, 1987, it has been proposed to compute a front wheel secondary steer angle $\delta f$ and a rear wheel secondary steering angle $\delta r$ for the given steering angle $\theta$ of the steering wheel by using the following formulas (1) and (2) and thereby exercise a proportional control and derivative control over the front and rear wheels, respectively.

$$\delta f/\theta = Kf + Tf \cdot S \qquad (1)$$

$$\delta r/\theta = Kr + Tr \cdot S \qquad (2)$$

where Kf and Kr are proportional constants, Tf and Tr are differential constants and S is a laplace operator.

The formula (2) can be rewritten as follows.

$$\delta r = Kr \cdot \theta + Tr \cdot \theta \cdot S = Kr \cdot \theta + Tr \qquad (3)$$

Figure 12:
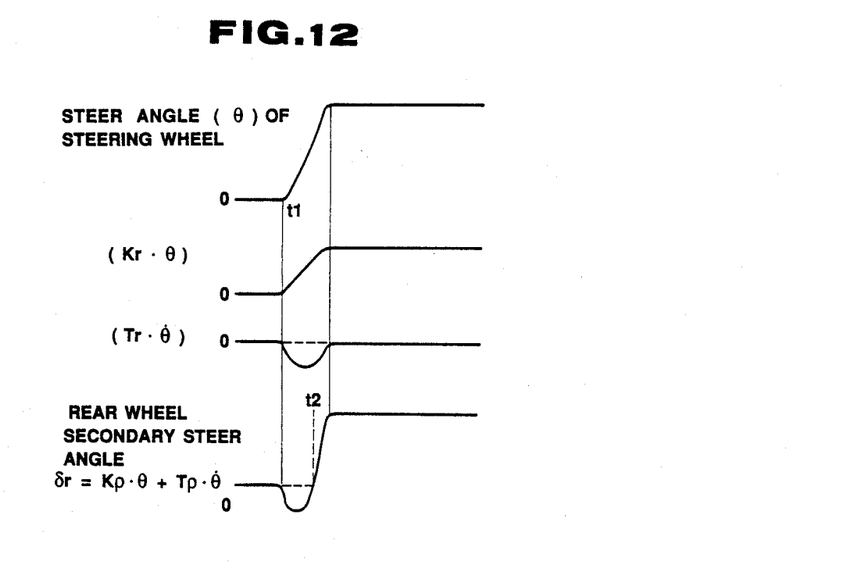
FIG. 12 is a time chart secondary steer according to a prior art method.

In the above formulas, Kf, Kr and Tf are set to be positive whereas Tr is set to be negative. Due to this, just after the moment t1, at which the rotation of the steering wheel begins, the rear wheel secondary steer angle $\delta r$ exhibited by the formula (3) immediately becomes such (until the moment t2) to be of such a phase opposite to that of the front wheels and thereafter returns to the same phase as the front wheels, as is apparent from FIG. 12, in which the rear wheel secondary steer angle $\delta r$ is shown together with $Kr \cdot \theta$ and $Tr \cdot \theta$. For this reason, the vehicle steering system is required to perform a complicated control and therefore the system becomes complicated, resulting in a problem of a high cost. Further, the system is required to have a high responsiveness, thus further increasing the cost.

SUMMARY OF THE INVENTION

In accordance with the present invention, there is provided an improved method of steering a vehicle having a set of steerable front wheels and a set of steerable rear wheels which are both secondarily steered upon main steering of the front wheels by a steering wheel. The method comprises providing to the front wheels a secondary steer angle corresponding to at least a differentiated value of a steering wheel operation in such away as to increase an overall steer angle of the front wheels and providing to the rear wheels a secondary steer angle proportional to the steering wheel operation and of the same phase as the steer angle of the front wheels.

In one aspect of the invention, the above described providing of the secondary steer angle to the rear wheels is performed with a time-lag of a first order.

This method is effective for solving the above noted problems inherent in the prior art vehicle steering. That is, the present invention attaches much importance to the vehicle head turning characteristic or the vehicle turning responsiveness than to the above described flat frequency chacteristic of the yaw rate and lateral acceleration and aims at solving the above problem in exchange for only a little deterioration or sacrifice of a vehicle performance characteristic.

It is accordingly an object of the present invention to provide an improved method of steering a vehicle which can improve the vehicle head turning characteristic or the turning responsiveness of the vehicle without requiring a complicated control.

It is another object of the present invention to provide an improved vehicle steering method of the above described character which enables a vehicle steering system to be simple in structure and therefore reduce the cost.

It is a further object of the present invention to provide an improved vehicle steering method of the above described character which enables a passenger or passengers to be free from uneasiness at the beginning of cornering of the vehicle.

It is a further object of the present invention to provide an improved vehicle steering method of the above described character which is attained by deteriorating or sacrificing a little bit the above described flat frequency characteristic of the yaw rate and lateral acceration.

DESCRIPTION OF THE PREFERRED EMBODIMENTS

Figure 1:
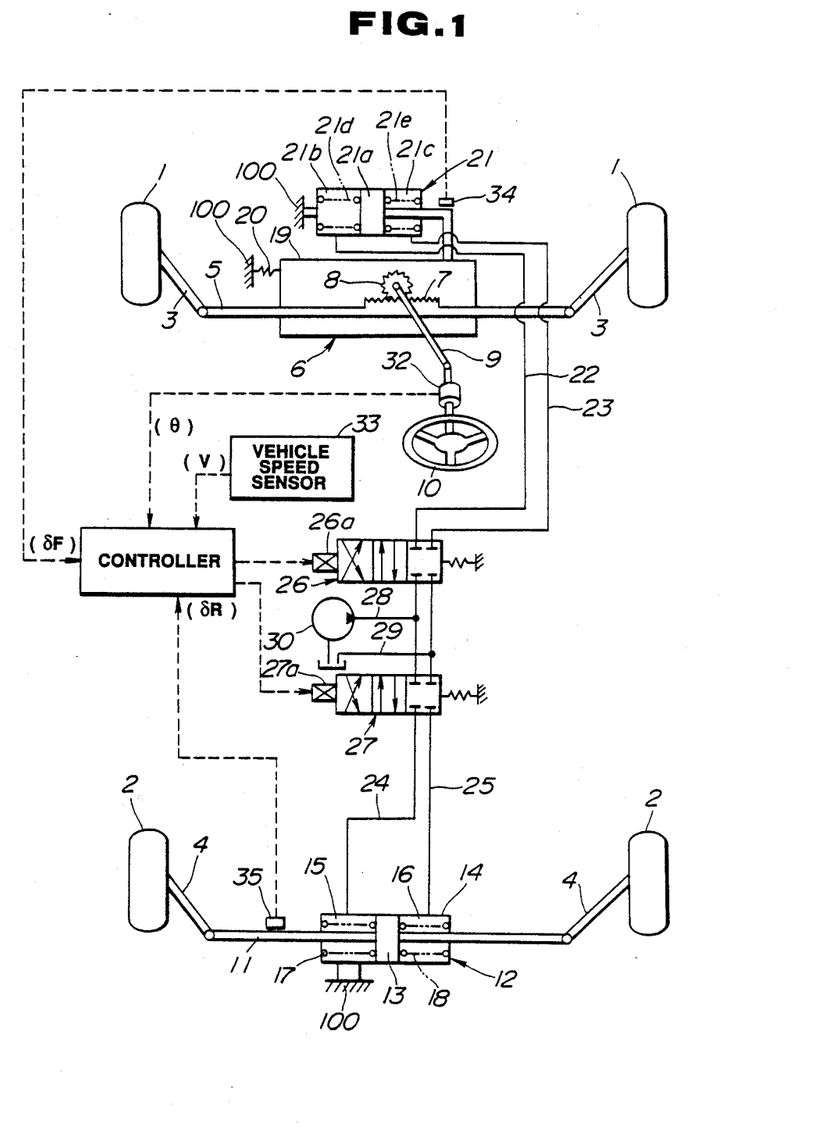
FIG. 1 is a schematic view of a vehicle steering system used for carrying out a method of this invention.

Referring to FIG. 1, a set of front wheels are indicated by the reference numerals 1 and 1 and a set of rear wheels are indicated by the reference numerals 2 and 2.

The front wheels 1 and 1 are steerably installed on a vehicle body 100 by means of steering knuckles 3 and 3. The rear wheels 2 and 2 are steerably installed on the vehicle body 100 by means of steering knuckles 4 and 4.

The steering knuckles 3 and 3 are interconnected by a tie rod 5 to which a rack 7 is fixedly attached to move together therewith. A pinion 8, meshing with the rack 7 to constitute a front wheel steering gear 6, is connected to a steering wheel 10 by way of a steering shaft 9.

The steering knuckles 4 and 4 are interconnected by a tie rod 11 to which a piston 13 of an actuator 12 for rear wheel steer is fixedly attached or installed to move together therewith. A cylinder 14 of the actuator 12 is fixedly installed on the vehicle body 100. The piston 13 is resiliently held in a center actuator position by means of springs 17 and 18 disposed within chambers 15 and 16, respectively.

A gear casing 19 of the front wheel steering gear 6 is not fixed to the vehicle body 100 but resiliently supported by an insulator 20 in such a way as to be longitudinally movable by at least an amount corresponding to a maximum secondary steer of the front wheels 1 and 1. An actuator 21 is provided between the gear casing 19 and the vehicle body 100 for enabling the gear casing 19 to effect the above longitudinal movement. The actuator 21 is constructed so that a piston 21a is held in a center actuator position by means of springs 21d and 21e disposed in chambers 21b and 21c on the opposite sides of the piston 21a, respectively. Conduits 22 and 23 respectively communicate with the chambers 21b and 21c and conduits 24 and 25 respectively communicated with the chambers 15 and 16 are connected by way of solenoid controlled valves 26 and 27 to a supply conduit 28 and a drain conduit 29, respectively. The supply conduit 28 is communicated with an outlet port of a pump 30 so as to be always supplied with a fluid pressure discharged by the pump 30.

The solenoid controlled valves 26 and 27 are three position directional control valves of the electromagnetically proportional type so as to have two step positions depending on energization of solenoids 26a and 27a, respectively. When the solenoids 26a and 27a are de-energized, the valves 26 and 27 obstruct communication of the conduits 22-25 with the supply conduit 28 and drain conduit 29 so that the actuators 12 and 21 are held in their having or present displaced positions, i.e., their pistons 13 and 21a are held stationary in the positions into which they have been moved. When the solenoids 26a and 27a are energized to allow the valves 26 and 27 to take their first step positions, the conduits 22 and 24 communicate with the supply conduit 28 whilst the conduits 23 and 25 with the drain conduit 29 for thereby causing the actuator pistons 13 and 21a to move in the right-hand direction in the drawing. When the solenoids 26a and 27a are energized to allow the valves 26 and 27 to take their second step positions, the conduits 22 and 24 are communicated with the drain conduit 29 whilst the conduits 23 and 25 with the supply conduit 28 for thereby causing the actuator pistons 12 and 21a to move in the left-hand direction in the drawing.

Energization and de-energization of the solenoids 26a, 27a are controlled by a secondary steer controller 31. To this end, the controller 31 receives from a steer angle sensor 32 a signal which represents a steer angle $\theta$ of the steering handle 10 and from a vehicle speed sensor 33 a signal which represents a vehicle speed V. The controller 31 further receives from stroke sensors 34 and 35 signals which represent strokes or movements of the actuator pistons 13 and 21a, i.e., a front wheel secondary steer actual angle $\delta F$ and a rear wheel secondary steer actual angle $\delta R$ for feedback control of the front and rear secondary steer. The controller 31 determines a front wheel secondary steer target angle $\delta f$ and a rear wheel secondary steer target angle $\delta r$ based on the input informations $\theta$ and V. Based on the difference between the secondary steer target angles $\delta f$, $\delta r$ and the secondary steer actual angles $\delta F$ and $\delta R$, the controller 31 controls energization and de-energization of the solenoids 26a and 27a independently so that the secondary steer target angles and the secondary steer actual angles correspond to each other. In this manner, the gear casing 19 and the tie rod 11 are moved by the actuators 12 and 21 under control of the controller 31, whereby to perform a secondary steer of the front and rear wheels 1, 1 and 2, 2.

The operation of the above described steering system will be described later.

Rotation of the steering wheel 10 causes the steering shaft 9 and therefore the pinion 8 to rotate. Rotation of the pinion 8 causes the rack 7 to make a stroke or move longitudinally for thereby causing the front wheels 1 and 1 to be steered in the corresponding direction by way of the steering knuckles 3 and 3, whereby to steer a vehicle to the corresponding direction.

In case of such cornering of the vehicle, the controller 31 determines, based on the steer angle $\theta$ of the steering wheel 10 and the vehicle speed V detected by the sensors 32 and 33, a front wheel secondary steer target angle $\delta f$ by computation of the following formula, $$\delta f / \theta = Kf + Tf \cdot S$$

$$\delta f = Kf \cdot \theta + Tf \cdot \theta \cdot S = Kf \cdot \theta + Tf \cdot \dot{\theta} \tag{4}$$

and a rear wheel target secondary steer angle $\delta r$ by computation of the following formula, $$\frac{\delta r}{\theta} = \frac{Kr}{1 + \tau \cdot S} \tag{5}$$

$$\delta r = \frac{Kr \cdot \theta}{1 + \tau \cdot S}$$

where $\tau$ is a time constant.

Figure 2:
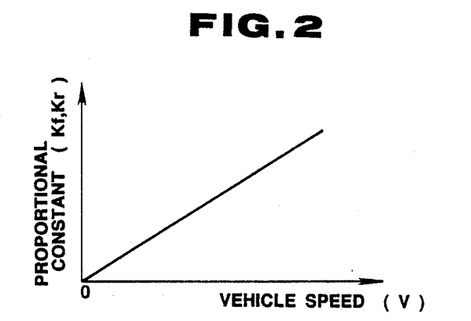
FIGS. 2 to 4 are graphs depicting the characteristics of various constants used in the method of this invention.
Figure 3:
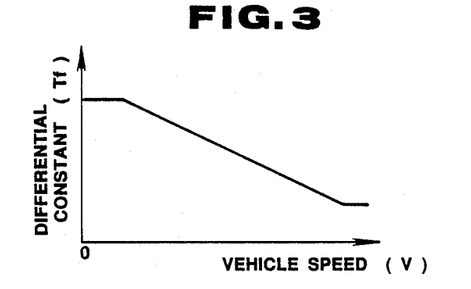
Figure 4:
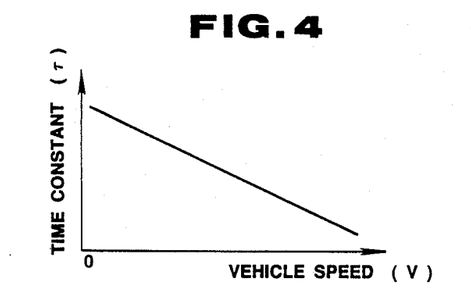

The proportional constants Kf and Kr are set to be of such functions of vehicle speed V as shown in FIG. 2, the differential constants Tf is set to be of such a function of vehicle speed V as shown in FIG. 3, and the time constant $\tau$ is set to be of such a function of vehicle speed V as shown in FIG. 4. The differential constant Kf, proportional constants Kf, Kr and time constant $\tau$ are obtained from those functions, and based on the thus obtained constants together with the steer angle $\theta$ of the steering wheel 10 and its differentiated value $\dot{\theta}$ and by using the formulas (4) and (5), the controller 31 computes the front wheel secondary steer target angle $\delta f$ and the rear wheel secondary steer target angel $\delta r$.

Based on these secondary steer target angles $\delta f$ and $\delta r$ and on the secondary steer actual angles $\delta F$ and $\delta R$, the controller 31 determines such energization and de-energization of the solenoids 26a, 27a that can attain $\delta f = \delta F$ and $\delta r = \delta R$, whereby to put the solenoids 26a and 27a into their first step positions or second step positions selectively. By this, the solenoid controlled valve 26 supplies fluid pressure from the pump 30 to one of the conduits 22 and 23 and at the same time drains the other of the same. As a result, the actuators 21 and 12 cause the pistons 21a and 13 to move in the corresponding direction for thereby moving the gear casing 19 and the tie rod 11 in the corresponding direction, whereby to secondarily steer the front wheels 1 and 1 and the rear wheels 2 and 2 by the target values δf and δr. When δF=δf and δR=δr are attained by the above control, the controller 31 makes the solenoids 26a and 27a de-energized for thereby holding the actuators 21 and 12 in their having controlled positions.

In the meantime, since the front wheel secondary steer target angle δf is given by the formula (4), the front wheels 1 and 1 are increasedly steered by the angle corresponding to the angular velocity $\dot{\theta}$ of rotation of the steering wheel 10 and the differential constant Tf in addition to the angle corresponding to the steer angle $\theta$ of the steering wheel 10 and the proportional constant Kf, whereby the front wheel secondary steer can be done by the so-called proportional control and differential control for improving the turning movement of the vehicle head (i.e., the cornering responsiveness).

On the other hand, since the rear wheel secondary steer target angle δr is given by the formula (5), the rear wheels 2 and 2 are secondarily steered by the angle proportional (proportional constant Kr) to the steer angle $\theta$ of the steering wheel 10 in the same direction as the front wheels 1 and 1, whereby the rear wheel secondary steer is done by the so-called proportional control for thereby improving the cornering stability of the vehicle. In the meantime, as will be apparent from the formula (5), the above described rear wheel secondary steer is performed with a time-lag of a first order corresponding to the time constant $\tau$, thus making it possible to eliminate such an otherwise caused uncomfortatable feel that a vehicle first slides laterally or sideways and thereafter starts turning.

While, in case of the above described front and rear secondary steer, the flat frequency characteristics of the yaw rate and lateral acceleration are sacrificed by some degree corresponding to the difference of the formulas (4) and (5) from the formulas (1) and (2), the more important vehicle head turning characteristic and the cornering stability can be retained assuredly and at the same time the uncomfortable feel at the begining of cornering can be eliminated.

As is apparent from the formulas (4) and (5), there is not caused such a moment at which the front and rear wheels are steered in the opposite directions during vehicle cornering. Thus, the steering system is not required to perform a complicated control and therefore can be simple in structure, thus making it possible to reduce the cost. Furthermore, the system is not required to have a high responsiveness, thus being further advantageous in view of the cost.

Figure 5:
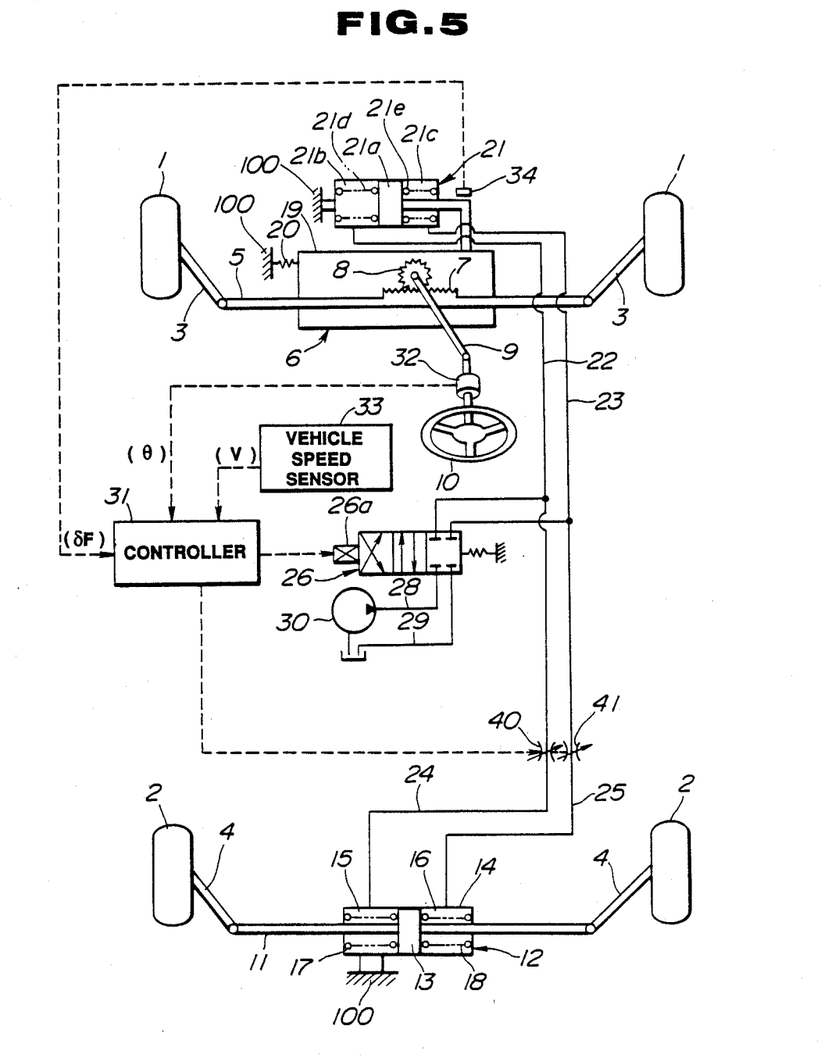
FIG. 5 is a schematic view of another steering system capable of carrying out the method of this invention.
Figure 6:
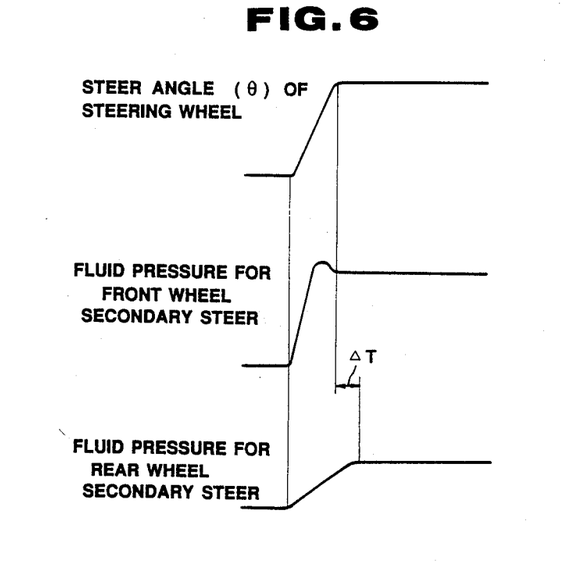
FIG. 6 is a time chart depicting changes of front and rear secondary steer pressures in the steering system of FIG. 5.

FIG. 5 shows another steering system capable of carrying out the method of this invention. In the figure, parts and portions like or corresponding to those of the steering system of FIG. 1 are designated by the same reference numerals. In this steering system, the fluid pressure supplied through the conduits 22 and 23 to the actuator 21 for front wheel secondary steer is also used for rear wheel secondary steer. To this end, the conduits 24 and 25 communicated with the chambers 15 and 16 of the actuator 12 for rear wheel steer and extending therefrom are connected to the conduits 22 and 23, and variable orifices 40 and 41 are disposed in the conduits 24 and 25. The degree of opening of the variable orifices 40 and 41 are commonly controlled by the controller 31 and determined so that the same rear wheel secondary steer as the previous embodiment is obtained. That is, in case where the steer angle $\theta$ of the steering wheel 10 varies as shown in FIG. 6 and therefore the fluid pressure in the conduits 22 and 23 that is determined in the above described manner for front wheel secondary steer is of such one shown in FIG. 6, the controller 31 determines the degree of opening of the variable orifices 40 and 41 for obtaining the rear wheel secondary steer target angle which is determined in the above described manner in relation to the fluid pressure for front wheel secondary steer, whereby to control the fluid pressure for rear wheel secondary steer to be supplied to the actuator 12. Accordingly, in this embodiment, the rear wheels 2 and 2 can be secondarily steered similarly to the previous example with a time-lag of a first order as indicated by ΔT in FIG. 6.

Figure 7:
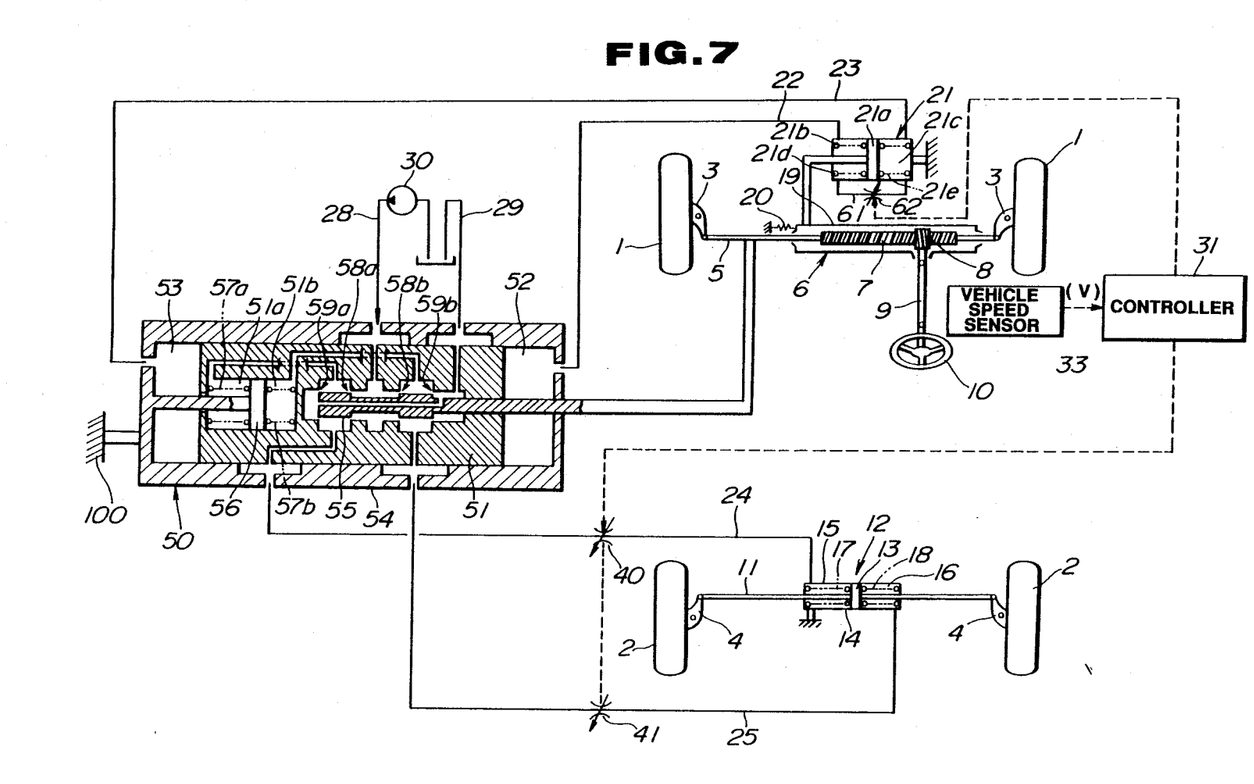
FIG. 7 is a schematic view of a further steering system capable of carrying out the method of this invention.

FIG. 7 shows a further steering system capable of carrying out the method of this invention, in which parts and portions like or corresponding to those of the previous steering system of FIG. 1 are designated by the same reference numerals. Since the above improvement in the vehicle head turning characteristic can be attained even if the front wheel secondary steer is performed by the derivative control only, this steering system is structured so as to connect the conduits 22 and 23 extending from the chambers 21b and 21c of the actuator 21 to the chambers 52 and 53 of the servo valves 50 separated by the piston 51. The servo valve 50 has a valve body 54 secured to the vehicle body 100 and a valve spool 55 slidably disposed in the piston 51 and fixed to the tie rod 5. The valve body 54 has fixed thereto a guide piston 56 which is in turn slidably disposed within the servo piston 51 to define chambers 51a and 51b. Springs 57a and 57b are disposed within the chambers 51a and 51b for resiliently holding the servo piston 51 in the center valve position.

Between the servo piston 51 and the spool 54 there are formed inlet valves 58a and 58b and outlet valves 59a and 59b, and a portion between the inlet valves 58a and 58b is communicated with the supply conduit 28. The upstream sides of the outlet valves 59a and 59b are respectively communicated with the corresponding chambers 51a and 51b and also with the corresponding chambers 15 and 16 of the actuator 12 for rear wheel steer through the conduits 24 and 25 in which the variable orifices 40 and 41 are disposed, and the downstream sides of the outlet valves 59a and 59b are communicated with the drain conduit 29.

Further, the two chambers 21b and 21c of the actuator 21 are communicated with each other by a conduit 61. A variable orifice 62 is disposed in the conduit 61 so that the communication between the chambers 21b and 21c is determined by the degree of opening of the variable orifice 52. The variable orifice 62 is controlled in its degree of opening by the controller 31 which also controls the degree of opening of the variable orifices 40 and 41 as mentioned above. The controller 31 increases the degree of opening of the variable orifice 62 as the vehicle speed V increases. In the meantime, the chambers 21b, 21c, 52 and 53 and the conduits 22 and 20 are filled with incompressible fluid.

The front wheel secondary steer of this embodiment is performed as follows. Upon steering of the vehicle to the left in which the tie rod 5 is moved rightwards, the plunger 55 moves rightwards reducing the degree of opening of the valve portions 58a and 59b. By this, such a pressure differential that the fluid pressure in the chamber 51b is higher while the fluid pressure in the chamber 51a is lower is caused between the chambers 51a and 51b, thus causing the servo piston 51 to move in response to movement of the plunger 55 while overcoming the bias of the springs 57a and 57b. By the rightward movement of the servo piston 51, fluid is caused to flow from the chamber 52 to the chamber 53 through the conduit 22, chamber 21b, variable orifice 62, chamber 21c and the conduit 23. On the contrary, upon steering of the vehicle to the right, the piston 51a is caused to move leftwards for causing fluid to flow from the chamber 53 to the chamber 52 through the conduit 23, chamber 21c variable orifice 62 and chamber 21b. In this instance, the variable orifice 62 offers a resistance based on its degree of opening, and a fluid pressure in accordance with the orifice opening and the rate of fluid flow is produced on the upstream side of the variable orifice 62, i.e., within the chambers 21b or 21c, thus causing the actuator piston 21a and therefore the gear casing 19 to move rightwards or leftwards for thereby increasing the steer angle of the front wheels 1 and 1.

Figure 8:
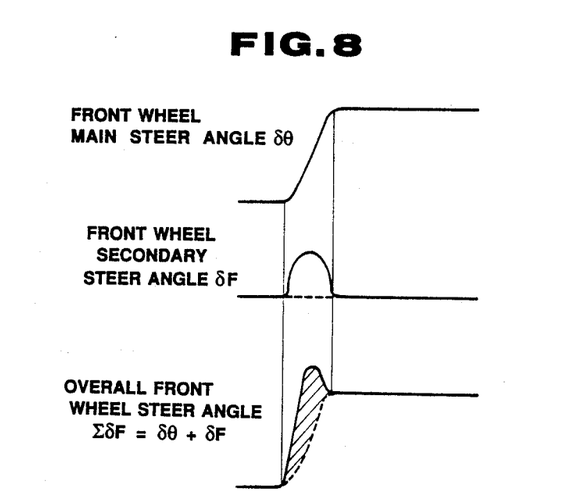
FIG. 8 is a time chart for front wheel steer in the steering system of FIG. 7.

That is, a description is made only for the case where the front wheel main steer angle $\delta\theta$ caused by the operation of the steering wheel 10 (i.e., the steer angle caused by the relative movement between the rack 7 and the gear casing 19) is as shown in FIG. 8, the actuator 21, between the moments t1 and t2 where the steer angle $\delta\theta$ is changing, causes the front wheels 1 and 1 to effect a secondary steer in the steer angle increasing direction and by the angle corresponding to the steering wheel rotation speed $\dot{\theta}$ and the degree of opening of the variable orifice 62. While this causes the front wheel overall steer angle $\Sigma\delta F$ to be increased by the amount indicated by the hatched portion in FIG. 8, it becomes possible to attain such a front wheel secondary steer control that is similar to the derivative control, i.e., similar to such a control that is obtained by ridding the proportional control portion from the control of the previous two embodiments since the secondary steer angle $\delta F$ increases as the steering wheel rotation speed increases. Further, since the secondary steer angle $\theta$ reduces as the variable orifice 62 increases and the degree of opening of the variable orifice is increased by the controller 31 as the vehicle speed V increases, the front wheel secondary steer responsive to vehicle speed is carried out substantially similarly to the above described embodiments.

Figure 9:
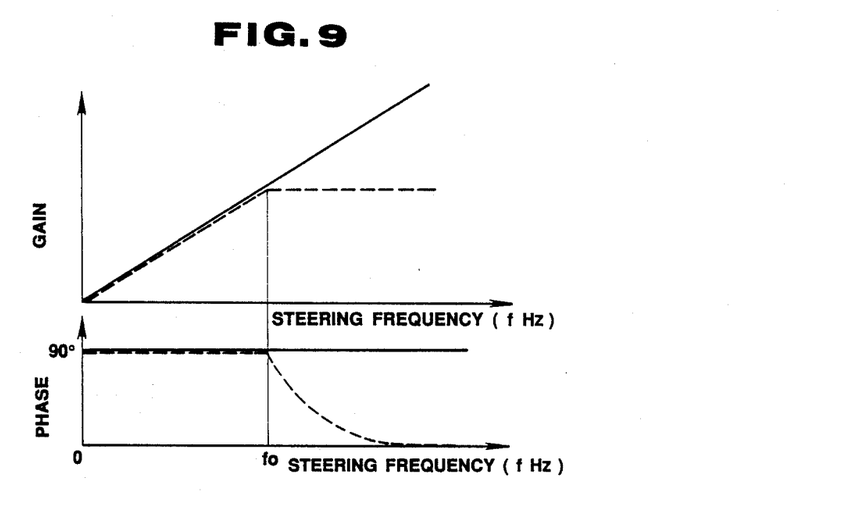
FIG. 9 is a diagram depicting the gain and phase characteristic of the system of FIG. 7 in comparison with that in the system of FIG. 1.

In the meantime, since the gain and the phase in this embodiment are those as shown by the dotted lines in FIG. 9, they are deviated from the gain and phase characteristic of the two previous embodiments over the zone larger than a certain steering frequency fo. Thus, in order to attain front wheel secondary steer similar to the above described embodiments, it is needless to say that an actually used frequency zone needs to be smaller than the steering frequency fo.

The rear wheel secondary steer in this embodiment will now be described. During the above secondary steering of the front wheels 1 and 1, the pressure differential bewen the chambers 51a and 51b is also caused between the chambers 15 and 16 of the actuator 12, thus causing the rear wheels 2 and 2 to be steered in the same directions by the higher pressure in the chamber 16 in case of steering of the vehicle to the left and by the higher pressure in the chamber 15 in case of steering of the vehicle to the right, respectively. In the meantime, since the orifices 40 and 41 are provided and controlled by the controller 31 in the way similar to FIG. 5, the rear wheel secondary steer can be performed with a time-lag of a first order similarly to the previous embodiment.

Figure 10:
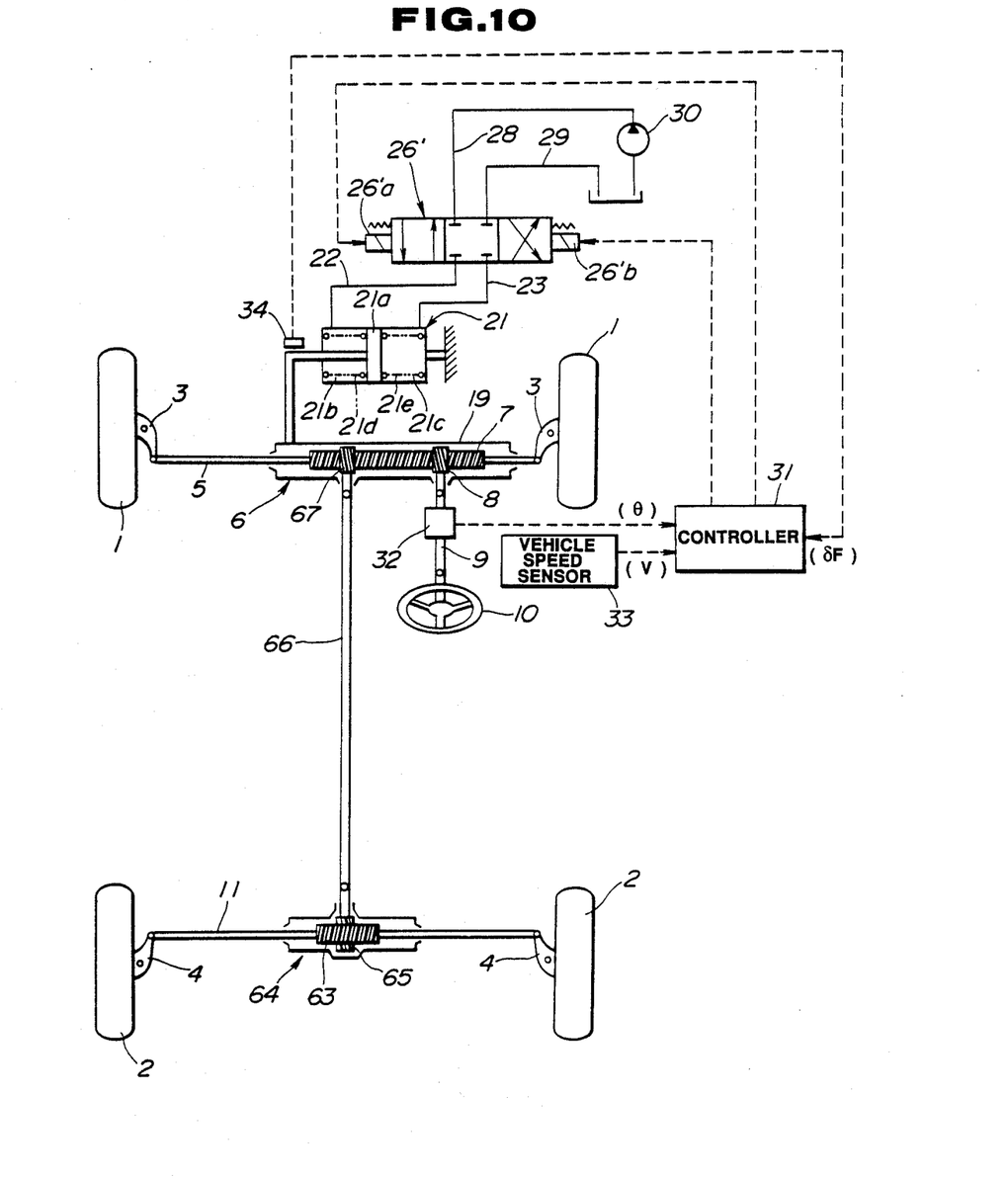
FIGS. 10 and 11 are schematic views of further steering systems capable of carrying out the method of this invention.

FIG. 10 shows a further vehicle steering system capable of carrying out the method of this invention, in which parts and portions like or corresponding to those of the previous steering system of FIG. 1 are designated by the same reference numerals. In this embodiment, a rack 63 constituting part of a rear wheel steering gear 64 is fixedly attached to the tie rod 11 interconnecting the steering knuckles 4 and 4 for the rear wheels 2 and 2. A pinion 65 meshing with the rack 63 to constitute the steering gear 64 is connected to an end of a rear wheel steering shaft 66. A pinion 67 is connected to the other end of the rear wheel steering shaft 66. The pinion 67 is meshed with the rack 7 in such a way that their relative locations with respect to the top-to-bottom direction of the vehicle body are opposite to those of the pinion 65 and the rack 63. While the solenoid controlled valve 26' is of the type having two solenoids 26'a and 26'b, it is operative substantially similarly to the aforementioned solenoid 26.

With this vehicle steering system, the proportional control of the rear wheels 2 and 2 is performed mechanically by means of a gear train.

In operation, movement of the rack 7 causes the pinion 67, rear wheel steering shaft 66 and pinion 65 to rotate, thus causing the rack 63 to make a stroke or move longitudinally. By this movement of the rack 63, the tie rod 11 is moved correspondingly thus causing the rear wheels 2 and 2 to be secondarily steered in the same direction or so as to be of the same phase as the front wheels 1 and 1 by way of the steering knuckles 4 and 4. In this instance, since the rear wheel secondary steer is performed mechanically by means of the steering gear 64 which is interlocked in operation with the steering gear 6, a rear wheel secondary steer angle $\delta R$ for a given steer angle $\theta$ of the steering wheel 10 is computed from the following formula, $$\delta R = Kr\cdot\theta \quad (6)$$

where Kr is the gear ratio of the gearing provided between the steering wheel 10 and the rack 63. Accordingly, the rear wheels 2 and 2 are secondarily steered by the angle proportional (proportional constant Kr) to the steer angle $\theta$ of the steering wheel 10 and in the same direction or so as to be of the same phase as the front wheels 1 and 1, thus performing the rear wheel secondary steer by the so-called proportional control and thereby making it possible to improve the turning or cornering stability of the vehicle.

On the other hand, upon secondarily steering of the front wheels 1 and 1, the controller 31 first computes a front wheel secondary steer target angle $\delta f$ from the following formula, $$\delta f/\theta = Tf\cdot S$$

$$\delta f = Tf\cdot\theta\cdot S = Tf\cdot\dot{\theta} \quad (7)$$

where Tf is such a function of vehicle speed as shown.

Based on the target steer angle $\delta f$ and the actual angle $\delta F$, the controller 31 determines which solenoids 26'a or 26'b is to be energized and supplies current to the corresponding solenoid 26'a or 26'b. By this, the solenoid controlled valve 26' allows one of the conduits 22 and 23 to be supplied with fluid pressure from the pump 30 and the other conduit 22 or 23 to be drained. As a result, the actuator 21 causes the piston 21a to move in the corresponding direction for thereby causing the gear casing 19 to move in the corresponding direction, whereby to increase the overall steer angle of the front wheels 1 and 1, i.e., the front wheels 1 and 1 are turned by the secondary steer angle in addition to a main steer angle determined by the front wheel steering gear 6. When $\delta F = \delta f$ is obtained, the controller 31 stops supplying the above described current and de-energizes both of the solenoids 26'a and 26'b for thereby holding the actuator 21 in their having controlled position.

The front wheels 1 and 1 are therefore secondarily steered by the steer angle corresponding to the angular velocity $\dot{\theta}$ of the steering wheel 10 and the differential constant Tf and in the direction of increasing the overall steer angle of the front wheels 1 and 1, whereby it becomes possible to perform the secondary steer of the front wheels 1 and 1 by the so-called derivative control and thereby improve the vehicle head turning characteristic (turning responsiveness).

Figure 11:
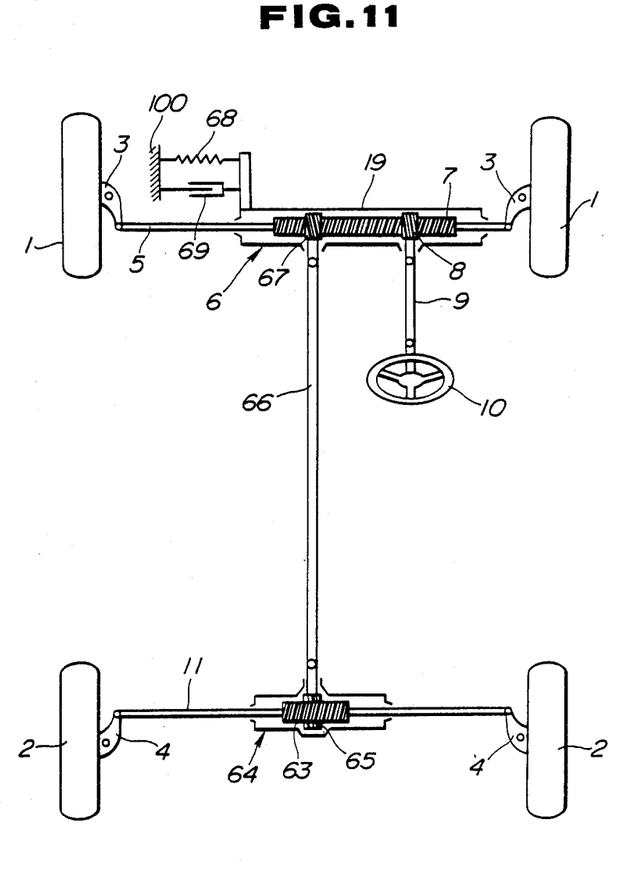

FIG. 11 shows a further vehicle steering system capable of carrying out the method of this invention, in which parts and portions like or corresponding to those of the steering system of FIG. 10 are designated by the same reference numerals. This embodiment is a simplified form of the steering system and includes a resilient means 68 for supporting the gear casing 19 upon the vehicle body 100 and a steering damper 69 such as a shock absorber, interposed between the gear casing 19 and the vehicle body 100 in such a way as to be effective in the longitudinal direction of the resilient means 68. By this strucutre, though a front wheel secondary steer control responsive to vehicle speed cannot be attained, front wheels can be secondarily steered in the manner like the above described drivative control.

What is claimed is:

1. A method of steering a vehicle having a set of steerable front wheels and a set of steerable rear wheels which are both secondarily steered upon main steering of the front wheels by operation of a steering wheel, the method comprising:
   providing to said front wheels a secondary steer angle corresponding to at least a differentiated value of a steering wheel operation, to increase an overall steer angle of said front wheels; and
   providing, with a time-lag of a first order, to said rear wheels a secondary steer angle proportional to said steering wheel operation and of the same phase as said steer angle of said front wheels.

2. A method as set forth in claim 1 wherein said differentiated value of said steering wheel operation is a differentiated value of a steer angle of said steering wheel.

3. A method as set forth in claim 2 wherein said said secondary steer angle of said front wheels is related to a vehicle speed.

4. A method as set forth in claim 3 wherein said first mentioned providing comprises detecting said steer angle of said steering wheel and said vehicle speed and computing a front wheel secondary steer target angle $\delta f$ and a rear wheel secondary steer target angle $\delta r$ from the following formulas, $$\delta f = Kf \cdot \theta + Tf \cdot \dot{\theta}$$

$$\delta r = \frac{Kr \cdot \theta}{1 + \tau \cdot S}$$

where $\theta$ is a steer angle of the steering wheel, $\dot{\theta}$ is a differentiated value of the steer angle $\theta$, Kf and Kr are proportional constants which are functions of vehicle speed, Tf is a differential constant which is a function of vehicle speed, and $\tau$ is a time constant which is a function of a vehicle speed.

5. A method as set forth in claim 4 wherein said first mentioned providing further comprises detecting a front wheel secondary steer actual angle $\delta F$ and a rear wheel secondary steer actual angle $\delta R$, and controlling the front and rear wheel steer so that $\delta f = \delta F$ and $\delta r = \delta R$ are attained.

6. A method as set forth in claim 1 wherein said first mentioned providing comprises detecting said steer angle of said steering wheel and said vehicle speed and computing a front wheel secondary steer target angle $\delta f$ from the following formula, $$\delta f = Tf \cdot \dot{\theta}$$

where Tf is a differential constant which is a function of vehicle speed and $\dot{\theta}$ is a differentiated value of a steer angle $\theta$ of said steering wheel.

7. A method as set forth in claim 6 wherein said first mentioned providing further comprises detecting a front wheel secondary steer actual angle $\delta F$ and controlling the front wheel secondary steer so that $\delta f = \delta F$ is attained.

8. A method as set forth in claim 7 wherein said second mentioned providing is performed so that said secondary steer angle of said rear wheels is directly proportional to a steer angle of said steering wheel.

* * * * *